(12) United States Patent
Rabipour et al.

(10) Patent No.: US 8,254,372 B2
(45) Date of Patent: Aug. 28, 2012

(54) DATA COMMUNICATION APPARATUS AND METHOD

(75) Inventors: Rafi Rabipour, Côte St-Luc (CA); Chung Cheung Chu, Brossard (CA)

(73) Assignee: Genband US LLC, Plano, TX (US)

( * ) Notice: Subject to any disclaimer, the term of this patent is extended or adjusted under 35 U.S.C. 154(b) by 2140 days.

(21) Appl. No.: 10/782,754

(22) Filed: Feb. 23, 2004

(65) Prior Publication Data
US 2004/0252681 A1    Dec. 16, 2004

Related U.S. Application Data

(60) Provisional application No. 60/448,459, filed on Feb. 21, 2003.

(51) Int. Cl.
- *H04L 12/66* (2006.01)
- *H04L 27/00* (2006.01)
- *G06F 15/16* (2006.01)
- *G06F 15/177* (2006.01)
- *G06F 17/28* (2006.01)
- *G10L 19/12* (2006.01)

(52) U.S. Cl. ........ 370/352; 709/247; 709/223; 709/221; 379/93.08; 379/93.15; 715/249; 704/221

(58) Field of Classification Search .......... 370/352–356, 370/401, 395.31–395.32, 465–467, 252; 379/93.08–93.09, 93.15, 93.32–93.34, 142.14; 704/221, 275; 455/552.1; 709/247, 227–228, 709/230–232, 220–221; 715/249–250

See application file for complete search history.

(56) References Cited

U.S. PATENT DOCUMENTS 3,652,798 A    3/1972    McNeilly et al.

(Continued)

FOREIGN PATENT DOCUMENTS

CA    2336699 A1    1/2000

(Continued)

OTHER PUBLICATIONS

ETSI TS 128 062 V4.2.0 (Dec. 2001) Technical Specification Digital cellular telecommunications system (Phase 2+) (GSM); Universal Mobile Telecommunications System (UMTS); Inband Tandem Free Operation (TFO) of Speech Codecs; Service Description; Stage 3 (3GPP TS 28.062 version 4.2.0 Release 4).*

(Continued)

*Primary Examiner* — Asad M Nawaz
*Assistant Examiner* — Wutchung Chu
(74) *Attorney, Agent, or Firm* — Jenkins, Wilson, Taylor & Hunt, P.A.

(57) ABSTRACT

Communication apparatus having interfaces for exchanging data with first and second neighbors, a memory for storing codec information regarding the communication apparatus and a control entity operative to detect a message from the first neighbor, the first message being indicative of codec information regarding an originating entity. In response, the control entity assesses compatibility between the codec information regarding the originating entity and the codec information regarding the communication apparatus. If the assessment is positive, the control entity self-identifies the communication apparatus as a candidate for terminally supporting a subsequent codec-bypass negotiation with the originating entity. If the assessment is negative, the control entity self-identifies the communication apparatus as a candidate for non-terminally supporting such negotiation. The invention thus capitalizes on the realization that although an end-to-end codec-bypass connection may not be possible, it may nevertheless be possible to achieve bandwidth savings by establishing a codec-bypass connection along only a portion of the path.

17 Claims, 7 Drawing Sheets

U.S. PATENT DOCUMENTS

| | | | |
|---|---|---|---|
| 4,048,446 A | 9/1977 | Hafner et al. | |
| 4,455,649 A * | 6/1984 | Esteban et al. | 370/522 |
| 4,545,052 A | 10/1985 | Steierman | |
| 5,295,136 A | 3/1994 | Ashley et al. | |
| 5,375,121 A | 12/1994 | Nishino et al. | |
| 5,612,957 A | 3/1997 | Gregerson et al. | |
| 5,710,976 A | 1/1998 | Hill et al. | |
| 5,740,157 A | 4/1998 | Demiray et al. | |
| 5,905,873 A | 5/1999 | Hartmann et al. | |
| 5,930,264 A | 7/1999 | Nguyen | |
| 5,933,487 A | 8/1999 | Strickland | |
| 5,956,673 A * | 9/1999 | Weaver et al. | 704/221 |
| 5,995,923 A | 11/1999 | Mermelstein et al. | |
| 5,999,529 A | 12/1999 | Bernstein et al. | |
| 6,006,189 A * | 12/1999 | Strawczynski et al. | 704/270 |
| 6,009,467 A | 12/1999 | Ratcliff et al. | |
| 6,026,086 A | 2/2000 | Lancelot et al. | |
| 6,031,904 A | 2/2000 | An et al. | |
| 6,046,999 A | 4/2000 | Miki et al. | |
| 6,078,595 A | 6/2000 | Jones et al. | |
| 6,141,784 A | 10/2000 | Davis et al. | |
| 6,144,667 A | 11/2000 | Doshi et al. | |
| 6,147,988 A | 11/2000 | Bartholomew et al. | |
| 6,172,990 B1 | 1/2001 | Deb et al. | |
| 6,246,879 B1 | 6/2001 | Segura et al. | |
| 6,256,612 B1 | 7/2001 | Vo et al. | |
| 6,272,358 B1 | 8/2001 | Brent et al. | |
| 6,275,578 B1 | 8/2001 | De Trana et al. | |
| 6,295,302 B1 * | 9/2001 | Hellwig et al. | 370/522 |
| 6,298,055 B1 * | 10/2001 | Wildfeuer | 370/352 |
| 6,324,409 B1 * | 11/2001 | Shaffer et al. | 455/552.1 |
| 6,324,515 B1 | 11/2001 | Rabipour et al. | |
| 6,339,594 B1 | 1/2002 | Civanlar et al. | |
| 6,353,666 B1 | 3/2002 | Henderson et al. | |
| 6,389,005 B1 | 5/2002 | Cruickshank | |
| 6,389,016 B1 | 5/2002 | Sabaa et al. | |
| 6,392,993 B1 | 5/2002 | Hamilton et al. | |
| 6,414,964 B1 | 7/2002 | Holmquist et al. | |
| 6,424,637 B1 | 7/2002 | Pecen et al. | |
| 6,463,454 B1 | 10/2002 | Lumelsky et al. | |
| 6,549,945 B1 | 4/2003 | Sinibaldi et al. | |
| 6,553,423 B1 | 4/2003 | Chen | |
| 6,574,469 B1 * | 6/2003 | Xiang et al. | 455/416 |
| 6,600,738 B1 * | 7/2003 | Alperovich et al. | 370/352 |
| 6,614,781 B1 | 9/2003 | Elliott et al. | |
| 6,625,169 B1 | 9/2003 | Tofano | |
| 6,647,428 B1 | 11/2003 | Bannai et al. | |
| 6,658,064 B1 | 12/2003 | Rotola-Pukkila et al. | |
| 6,671,367 B1 | 12/2003 | Graf et al. | |
| 6,693,996 B2 | 2/2004 | Mansfield | |
| 6,721,269 B2 | 4/2004 | Cao et al. | |
| 6,731,627 B1 | 5/2004 | Gupta et al. | |
| 6,731,647 B2 | 5/2004 | Yao | |
| 6,765,931 B1 | 7/2004 | Rabenko et al. | |
| 6,778,517 B1 | 8/2004 | Lou et al. | |
| 6,781,983 B1 | 8/2004 | Armistead | |
| 6,795,437 B1 | 9/2004 | Räsänen et al. | |
| 6,842,461 B2 | 1/2005 | Harris | |
| 6,845,089 B1 | 1/2005 | Gu et al. | |
| 6,850,778 B1 | 2/2005 | Honkala et al. | |
| 6,850,883 B1 | 2/2005 | Kapanen et al. | |
| 6,865,220 B2 | 3/2005 | Abrishami | |
| 6,876,646 B1 | 4/2005 | Dore et al. | |
| 6,885,638 B2 | 4/2005 | Xu et al. | |
| 6,898,208 B1 | 5/2005 | Sligo et al. | |
| 6,944,166 B1 | 9/2005 | Perinpanathan et al. | |
| 6,956,816 B1 | 10/2005 | Alexander et al. | |
| 6,967,958 B2 | 11/2005 | Ono et al. | |
| 6,967,972 B1 | 11/2005 | Volftsun et al. | |
| 6,973,024 B1 | 12/2005 | Joseph et al. | |
| 6,983,163 B2 | 1/2006 | Sato et al. | |
| 6,985,530 B1 | 1/2006 | Zerbe | |
| 6,990,340 B2 | 1/2006 | Tamura et al. | |
| 6,999,459 B1 | 2/2006 | Callon et al. | |
| 7,006,489 B2 | 2/2006 | Li et al. | |
| 7,023,819 B2 | 4/2006 | Falsafi | |
| 7,054,318 B2 | 5/2006 | Eneroth et al. | |
| 7,054,320 B1 | 5/2006 | Lee et al. | |
| 7,058,085 B2 | 6/2006 | Earnshaw et al. | |
| 7,068,623 B1 | 6/2006 | Barany et al. | |
| 7,072,358 B2 | 7/2006 | Suvanen | |
| 7,082,143 B1 | 7/2006 | LeBlanc et al. | |
| 7,085,289 B2 | 8/2006 | Cromer et al. | |
| 7,089,011 B1 | 8/2006 | Mangal | |
| 7,095,733 B1 | 8/2006 | Yarlagadda et al. | |
| 7,103,021 B2 | 9/2006 | Jou | |
| 7,106,701 B2 | 9/2006 | Stümpert et al. | |
| 7,133,694 B2 * | 11/2006 | Lanig et al. | 455/560 |
| 7,136,375 B1 * | 11/2006 | Koistinen | 370/352 |
| 7,162,024 B2 | 1/2007 | Wah et al. | |
| 7,174,156 B1 * | 2/2007 | Mangal | 455/406 |
| 7,180,892 B1 | 2/2007 | Tackin | |
| 7,181,209 B2 | 2/2007 | Tamura | |
| 7,233,595 B1 | 6/2007 | Hollis et al. | |
| 7,240,000 B2 * | 7/2007 | Harada | 704/212 |
| 7,245,589 B2 | 7/2007 | Neulist et al. | |
| 7,245,931 B2 | 7/2007 | Wang et al. | |
| 7,280,530 B2 * | 10/2007 | Chang et al. | 370/352 |
| 7,304,984 B2 | 12/2007 | Butler et al. | |
| 7,305,229 B2 | 12/2007 | Fox et al. | |
| 7,349,698 B2 | 3/2008 | Gallagher et al. | |
| 7,369,859 B2 | 5/2008 | Gallagher | |
| 7,400,881 B2 | 7/2008 | Kallio | |
| 7,411,941 B2 * | 8/2008 | Chu et al. | 370/352 |
| 7,471,655 B2 | 12/2008 | Gallagher et al. | |
| 7,483,374 B2 | 1/2009 | Nilakantan et al. | |
| 7,593,415 B2 | 9/2009 | Li et al. | |
| 7,729,346 B2 | 6/2010 | Lee et al. | |
| 7,792,096 B2 | 9/2010 | Doleh et al. | |
| 7,792,150 B2 | 9/2010 | Chen et al. | |
| 7,830,864 B2 | 11/2010 | Li | |
| 7,835,346 B2 | 11/2010 | He et al. | |
| 7,990,865 B2 | 8/2011 | Chu et al. | |
| 8,027,265 B2 | 9/2011 | Chu et al. | |
| 2001/0024960 A1 * | 9/2001 | Mauger | 455/552 |
| 2001/0036158 A1 | 11/2001 | Hallenstal et al. | |
| 2001/0043577 A1 | 11/2001 | Barany et al. | |
| 2002/0001302 A1 | 1/2002 | Pickett | |
| 2002/0013147 A1 | 1/2002 | Fauconnier et al. | |
| 2002/0019881 A1 * | 2/2002 | Bokhari et al. | 709/246 |
| 2002/0027930 A1 * | 3/2002 | Huh et al. | 370/522 |
| 2002/0049860 A1 * | 4/2002 | Koistinen | 709/247 |
| 2002/0054571 A1 | 5/2002 | Falsafi | |
| 2002/0072364 A1 | 6/2002 | Tamura | |
| 2002/0106029 A1 | 8/2002 | Bunn et al. | |
| 2002/0118673 A1 * | 8/2002 | Abrishami et al. | 370/352 |
| 2003/0005106 A1 | 1/2003 | Isoda | |
| 2003/0032440 A1 | 2/2003 | Sato et al. | |
| 2003/0058822 A1 | 3/2003 | Jou | |
| 2003/0063569 A1 | 4/2003 | Kalliokulju et al. | |
| 2003/0072273 A1 | 4/2003 | Aiello et al. | |
| 2003/0093509 A1 | 5/2003 | Li et al. | |
| 2003/0112796 A1 | 6/2003 | Kwan | |
| 2003/0117954 A1 | 6/2003 | De Neve et al. | |
| 2003/0123466 A1 | 7/2003 | Somekh et al. | |
| 2003/0123485 A1 | 7/2003 | Yi et al. | |
| 2003/0133423 A1 | 7/2003 | LaDue | |
| 2003/0134653 A1 | 7/2003 | Sarkkinen et al. | |
| 2003/0135376 A1 | 7/2003 | Harada | |
| 2003/0135784 A1 | 7/2003 | Yamaguchi et al. | |
| 2003/0189720 A1 * | 10/2003 | Bei et al. | 358/1.15 |
| 2003/0195981 A1 * | 10/2003 | Graf et al. | 709/238 |
| 2003/0210659 A1 | 11/2003 | Chu et al. | |
| 2003/0233274 A1 | 12/2003 | Urken et al. | |
| 2004/0008652 A1 | 1/2004 | Tanzella et al. | |
| 2004/0010582 A1 | 1/2004 | Oliver | |
| 2004/0037224 A1 | 2/2004 | Choi et al. | |
| 2004/0037314 A1 | 2/2004 | Spear | |
| 2004/0047364 A1 | 3/2004 | Briggs et al. | |
| 2004/0066745 A1 | 4/2004 | Joe | |
| 2004/0073424 A1 | 4/2004 | Geppert et al. | |
| 2004/0090989 A1 | 5/2004 | Kobayashi | |
| 2004/0100914 A1 | 5/2004 | Hellwig et al. | |
| 2004/0101125 A1 | 5/2004 | Graf et al. | |
| 2004/0110539 A1 | 6/2004 | El-Maleh et al. | |
| 2004/0114588 A1 | 6/2004 | Bhaskaran | |
| 2004/0114626 A1 | 6/2004 | Cline et al. | |

| | | | |
|---|---|---|---|
| 2004/0114922 A1 | 6/2004 | Hardee | |
| 2004/0131025 A1 | 7/2004 | Dohler et al. | |
| 2004/0133419 A1 | 7/2004 | El-Maleh et al. | |
| 2004/0136447 A1 | 7/2004 | LeBlanc | |
| 2004/0196867 A1 | 10/2004 | Ejzak et al. | |
| 2004/0208132 A1 | 10/2004 | Neulist et al. | |
| 2004/0228279 A1 | 11/2004 | Midtun et al. | |
| 2004/0254786 A1* | 12/2004 | Kirla et al. | 704/216 |
| 2004/0266426 A1 | 12/2004 | Marsh et al. | |
| 2004/0267897 A1 | 12/2004 | Hill et al. | |
| 2005/0007973 A1 | 1/2005 | Jang et al. | |
| 2005/0013281 A1 | 1/2005 | Milton et al. | |
| 2005/0013286 A1 | 1/2005 | Holland et al. | |
| 2005/0027948 A1 | 2/2005 | Marlan et al. | |
| 2005/0048973 A1 | 3/2005 | Hou et al. | |
| 2005/0064907 A1 | 3/2005 | Nealon | |
| 2005/0073977 A1 | 4/2005 | Vanghi et al. | |
| 2005/0074017 A1 | 4/2005 | Qian et al. | |
| 2005/0084094 A1 | 4/2005 | Gass et al. | |
| 2005/0085181 A1 | 4/2005 | Tao | |
| 2005/0099940 A1 | 5/2005 | Ohenoja et al. | |
| 2005/0105512 A1 | 5/2005 | Myhre et al. | |
| 2005/0157823 A1 | 7/2005 | Sudhakar | |
| 2005/0172013 A1 | 8/2005 | Tan et al. | |
| 2005/0185604 A1 | 8/2005 | Agarwal | |
| 2005/0195829 A1 | 9/2005 | Ward | |
| 2005/0232232 A1* | 10/2005 | Farber et al. | 370/352 |
| 2005/0265279 A1 | 12/2005 | Markovic et al. | |
| 2005/0267746 A1 | 12/2005 | Jelinek et al. | |
| 2005/0286466 A1 | 12/2005 | Tagg et al. | |
| 2006/0046658 A1 | 3/2006 | Cruz et al. | |
| 2006/0050664 A1 | 3/2006 | Guey | |
| 2006/0062225 A1 | 3/2006 | Li et al. | |
| 2006/0067221 A1 | 3/2006 | Lee et al. | |
| 2006/0072555 A1 | 4/2006 | St. Hilaire et al. | |
| 2006/0092927 A1 | 5/2006 | Li et al. | |
| 2006/0133353 A1 | 6/2006 | Wang et al. | |
| 2006/0154686 A1 | 7/2006 | Sarkkinen et al. | |
| 2006/0193289 A1 | 8/2006 | Ronneke et al. | |
| 2006/0198347 A1 | 9/2006 | Hurtta et al. | |
| 2006/0209873 A1 | 9/2006 | Knabchen et al. | |
| 2006/0229068 A1 | 10/2006 | Niemela et al. | |
| 2006/0268845 A1 | 11/2006 | He et al. | |
| 2006/0291454 A1 | 12/2006 | Ali | |
| 2006/0291483 A1 | 12/2006 | Sela | |
| 2007/0011727 A1 | 1/2007 | Mielenz et al. | |
| 2007/0041320 A1 | 2/2007 | Chen et al. | |
| 2007/0041360 A1 | 2/2007 | Gallagher et al. | |
| 2007/0043558 A1 | 2/2007 | Schwarz et al. | |
| 2007/0104114 A1 | 5/2007 | Chu et al. | |
| 2007/0116018 A1 | 5/2007 | Doleh et al. | |
| 2007/0123196 A1 | 5/2007 | Tamura | |
| 2007/0127357 A1 | 6/2007 | Tamura | |
| 2007/0127436 A1 | 6/2007 | Karimi-Cherkandi et al. | |
| 2007/0135165 A1 | 6/2007 | Junghanns et al. | |
| 2007/0140214 A1 | 6/2007 | Zoltan | |
| 2007/0140293 A1 | 6/2007 | Agarwal et al. | |
| 2007/0165636 A1 | 7/2007 | He et al. | |
| 2007/0171841 A1 | 7/2007 | Witzel et al. | |
| 2007/0186002 A1 | 8/2007 | Campbell et al. | |
| 2007/0286082 A1 | 12/2007 | Hikspoors et al. | |
| 2008/0008312 A1 | 1/2008 | Ganesamoorthi et al. | |
| 2008/0039087 A1 | 2/2008 | Gallagher et al. | |
| 2008/0102794 A1 | 5/2008 | Keevill et al. | |
| 2008/0123596 A1 | 5/2008 | Gallagher et al. | |
| 2008/0151845 A1 | 6/2008 | Jaakkola et al. | |
| 2008/0160987 A1 | 7/2008 | Wang et al. | |
| 2008/0225765 A1 | 9/2008 | Marinier et al. | |
| 2008/0240079 A1 | 10/2008 | Chu et al. | |
| 2008/0288245 A1 | 11/2008 | El-Maleh et al. | |
| 2008/0293416 A1 | 11/2008 | Yi et al. | |
| 2008/0316980 A1 | 12/2008 | Ahlen et al. | |
| 2010/0305943 A1* | 12/2010 | Witzel et al. | 704/201 |
| 2011/0032927 A1 | 2/2011 | Chen et al. | |

FOREIGN PATENT DOCUMENTS

| | | |
|---|---|---|
| CN | 1504039 A | 6/2004 |
| CN | 1 553 723 | 12/2004 |
| CN | 101341730 A | 1/2009 |
| DE | 198 29 822 A1 | 1/2000 |
| EP | 0 907 280 A2 | 4/1999 |
| EP | 1 017 217 A2 | 7/2000 |
| EP | 1 076 466 A1 | 2/2001 |
| FI | 20011715 | 2/2003 |
| GB | 2363295 | 12/2001 |
| GB | 2 389 486 A | 12/2003 |
| WO | WO 99/291326 | 6/1999 |
| WO | WO 99/40569 | 8/1999 |
| WO | WO 00/51330 | 8/2000 |
| WO | WO 00/70885 | 11/2000 |
| WO | WO 01/26390 A1 | 4/2001 |
| WO | WO 02/052414 A1 | 7/2002 |
| WO | WO 03/019961 A1 | 3/2003 |
| WO | WO 03/043299 A1 | 5/2003 |
| WO | WO 03/103313 A1 | 12/2003 |
| WO | WO 2004/006616 A2 | 1/2004 |
| WO | WO 2004/019568 A2 | 3/2004 |
| WO | WO 2004/075582 A1 | 9/2004 |
| WO | WO 2005/050960 A1 | 6/2005 |
| WO | WO 2005/089055 | 9/2005 |
| WO | WO 2007/022461 A2 | 2/2007 |
| WO | WO 2007/061548 A1 | 5/2007 |
| WO | WO 2007/084417 A2 | 7/2007 |
| WO | WO 2008/082605 A1 | 7/2008 |

OTHER PUBLICATIONS

ETSI: "Digital cellular telecommunications system (Phase 2+): Inband Tandem Free Operation (TFO) of Speech Codecs; Service Description; Stage 3 (GSM 04.53 version 1.6.0)" GSM Global System for Mobile Telecommunications, Online, Oct. 1998, pp. 1-69, XP002283034.

ETSI: Digital Cellular telecommunication system (Phase 2+) (GSM); Universal Mobile Telecommunications System (UMTS); Inband Tandem Free Operation (TFO) of speech codecs; Service Description; Stage 3 (3GPP TS 28.062 version 5.0.0 Release 5) ETSI TS 128 062 V5.0.0, xx,xx, Mar. 2002, pp. 14-19, 35-51, 56-59, 81-88, 164-168, XP002248624.

International Search Report of PCT/CA2004/000300 mailed on Jul. 15, 2004.

Written Opinion of the International Searching Authority of PCT/CA2004/000300 mailed on Jul. 15, 2004.

Notice of Allowance and Fee(s) Due for U.S. Appl. No. 11/589,435 (Jan. 11, 2011).

Interview Summary for U.S. Appl. No. 11/589,435 (Dec. 1, 2010).

Chinese Official Action for Chinese Patent Application No. 200780051814.6 (Oct. 27, 2010).

Chinese Official Action for Chinese Patent Application No. 200680038614.2 (Oct. 27, 2010).

Official Action for U.S. Appl. No. 11/965,994 (Sep. 28, 2010).

Notice of Allowance and Fee(s) Due for U.S. Appl. No. 10/599,088 (Sep. 27, 2010).

Official Action for U.S. Appl. No. 11/589,435 (Aug. 10, 2010).

Notice of Allowance and Fee(s) Due for U.S. Appl. No. 11/351,339 (Jun. 25, 2010).

Notice of Panel Decision from Pre-Appeal Brief Review for U.S. Appl. No. 11/589,435 (May 25, 2010).

Notice of Allowance and Fee(s) Due for U.S. Appl. No. 11/282,943 (May 6, 2010).

Notice of Allowance and Fee(s) Due for U.S. Appl. No. 11/207,572 (May 3, 2010).

Official Action for U.S. Appl. No. 10/599,088 (Mar. 25, 2010).

Interview Summary for U.S. Appl. No. 11/282,943 (Mar. 11, 2010).

Final Official Action for U.S. Appl. No. 11/351,339 (Mar. 1, 2010).

Notice of Allowance and Fee(s) Due for U.S. Appl. No. 11/207,572 (Jan. 26, 2010).

Notice of Panel Decision from Pre-Appeal Brief Review for U.S. Appl. No. 10/599,088 (Jan. 22, 2010).

Final Official Action for U.S. Appl. No. 11/282,943 (Jan. 22, 2010).

Final Official Action for U.S. Appl. No. 11/589,435 (Nov. 20, 2009).

Interview Summary for U.S. Appl. No. 11/207,572 (Oct. 16, 2009).

Interview Summary for U.S. Appl. No. 11/282,943 (Oct. 1, 2009).

Notice of Allowance and Fee(s) Due for U.S. Appl. No. 10/235,959 (Aug. 12, 2009).

Final Official Action for U.S. Appl. No. 11/282,943 (Jun. 22, 2009).
Final Official Action for U.S. Appl. No. 10/599,088 (Jun. 4, 2009).
Final Official Action for U.S. Appl. No. 11/207,572 (May 28, 2009).
Official Action for U.S. Appl. No. 11/589,435 (May 14, 2009).
Interview Summary for U.S. Appl. No. 11/282,943 (Apr. 8, 2009).
Official Action for U.S. Appl. No. 11/351,339 (Apr. 1, 2009).
Final Official Action for U.S. Appl. No. 10/235,959 (Mar. 3, 2009).
Official Action for U.S. Appl. No. 10/599,088 (Nov. 5, 2008).
Official Action for U.S. Appl. No. 11/282,943 (Oct. 28, 2008).
Non-Final Official Action for U.S. Appl. No. 11/207,572 (Oct. 6, 2008).
Notice of Allowance and Fee(s) Due for U.S. Appl. No. 11/351,339 (Sep. 26, 2008).
Official Action for U.S. Appl. No. 10/235,959 (Jul. 25, 2008).
Final Official Action for U.S. Appl. No. 10/235,959 (May 14, 2008).
Notification of Transmittal of the International Search Report and the Written Opinion of the International Searching Authority, or the Declaration for International Application No. PCT/US07/26413 (Apr. 29, 2008).
Communication pursuant to Rules 161 and 162 EPC for European application No. 06813571.4 (Mar. 28, 2008).
Notification of Transmittal of the International Search Report and the Written Opinion of the International Searching Authority, or the Declaration for International Application No. PCT/US07/00942 (Oct. 12, 2007).
Official Action for U.S. Appl. No. 10/235,959 (Jul. 12, 2007).
Official Action mailed on May 17, 2007 in connection with corresponding U.S. Appl. No. 10/682,070.
Notification of Transmittal of the International Search Report and the Written Opinion of the International Searching Authority, or the Declaration for International Application No. PCT/US06/32484 (May 7, 2007).
Notification of Transmittal of the International Search Report and the Written Opinion of the International Searching Authority, or the Declaration for International Application No. PCT/US2006/041065 (Apr. 26, 2007).
Notice of Allowance and Fee(s) Due for U.S. Appl. No. 10/293,613 (Dec. 19, 2006).
Official Action for U.S. Appl. No. 10/293,613 (Jul. 7, 2006).
Restriction Requirement for U.S. Appl. No. 10/293,613 (Apr. 4, 2006).
"Rationale for Reverse Direction Capability List," Study Group 16, ITU—Telecommunication Standardization Sector, Nortel Networks (Nov. 2005).
International Search Report for PCT/IB2005/000730 (Oct. 3, 2005).
"Third Generation Partnership Project; Technical Specification Group Core Network and Terminals; Interworking Between the IP Multimedia (IM) Core Network (CN) Subsystem and Circuit Switched (CS) Networks (Release 6)" 3GPP TS 29.163, pp. 1-128 (Jun. 2005).
Agilent Technologies, "UMTS Network and Service Assurance," International Engineering Consortium, http://www.iec.org/online/tutorials/agilent_umts_network/topic03.html, pp. 1-4 (Copyright 2005).
"Digital Cellular Telecommunications System Phase (2+); Universal Mobile Telecommunications System (UMTS); AMR Speech Codec, Wideband; Interface to Iu and Uu (3GPP TS 26.202 version 6.0.0 Release 6)," Global System for Mobile Communications ETSI TS 126 202, pp. 1-14 (Dec. 2004).
"Digital Cellular Telecommunications System (Phase2+); Universal Mobile Telecommunications System (UMTS) Inband Tandem Free Operation (TFO) of Speec Codecs," (Dec. 2004), ETSI TS 128 062 v. 6.1.0, European Telecommunications Standards Institute (Dec. 2004).
"Series G: Transmission Systems and Media, Digital Systems and Networks," ITU-T, G.161, International Telecommunication Union (Jun. 2004).
R.L. Bunting (Editor), "Transcoder Free Operation," 3$^{rd}$ Generation Partnership, Version 1.0, Project 2 (Mar. 18, 2004).
Partial International Search Report, PCT/CA03/00972 (Nov. 3, 2003).
Yoo et al., "A Media Stream Processing of VoIP Media Gateway," IEEE, p. 91-94 (Copyright 2003).

Sjoberg et al., "Real-Time Transport Protcol (RTP) Payload Format and File Storage Format for the adaptive Multi-Rate (AMR) and Adaptive Multi-Rate Wideband (AMR-WB) Audio Codecs," Network Working Group, http://www.apps.ietf.org/rfc/rfc3267html, pp. 1-48 (Jun. 2002).
"3$^{rd}$ Generation Partnership Project; Technical Specification Group Core Network; Bearer-independent Circuit-Switched Core Network; Stage 2 (Release 4)," 3GPP TS 23.205 V4.4.0, pp. 1-183 (Mar. 2002).
"3$^{rd}$ Generation Partnership Project; Technical Specification Group Services and System Aspects; Inband Tandem Free Operation (TFO) of Speech Codecs; Service Description; Stage 3 (Release 5)," 3GPP TS 28.062 V5.0.0, pp. 1-175 (Mar. 2002).
"Implementing Media Gateway Control Protocols," RADVision, pp. 1-16 (Jan. 27, 2002).
"3$^{rd}$ Generation Partnership Project; Technical Specification Group Core Network; Out of Band Transcoder Control—Stage 2; (Release 4)," 3GPP TS 23.153 V4.4.0 Release 4, pp. 1-45 (Dec. 2001).
"3$^{rd}$ Generation Partnership Project; Technical Specification Group (TSG) RAN3; Transcoder Free Operation (Release 4)," 3GPP TR 25.953 V4.0.0, pp. 1-15 (Mar. 2001).
Third Generation Partnership Project, Meeting Report v3.0.0, 3GPP TSG-TrFO Workshop#04, pp. 1-18 (Oct. 17-19, 2000).
"Series G: Transmission Systems and Media, Digital Systems and Networks; Digital Transmission Systems—Terminal Equipments—Coding of Analogue Signals by Pulse Code Modulation," ITU-T G.711, Appendix II, pp. 1-18 (Feb. 2000).
Final Official Action for U.S. Appl. No. 11/984,490 (Jul. 27, 2011).
Communication pursuant to Rules 70(2) and 70a(2) EPC for European application No. 07868090.7 (Jun. 7, 2011).
Supplementary European Search Report for European Patent No. 2 108 193 (May 19, 2011).
Official Action for U.S. Appl. No. 11/984,490 (May 2, 2011).
Notice of Allowance and Fee(s) Due for U.S. Appl. No. 11/589,435 (Apr. 22, 2011).
Notice of Allowance and Fee(s) Due for U.S. Appl. No. 10/599,088 (Apr. 11, 2011).
Notification of Transmittal of the International Search Report and the Written Opinion of the International Searching Authority, or the Declaration for International Application No. PCT/US2010/044314 (Mar. 24, 2011).
Notice of Allowance for U.S. Appl. No. 11/965,994 (Mar. 16, 2011).
Official Action for U.S. Appl. No. 10/599,088 (Feb. 24, 2011).
Chinese Official Action for Chinese Patent Application No. 200780009550.8 (Dec. 21, 2010).
"3$^{rd}$ Generation Partnership Project; Technical Specification Group Services and System Aspects; Comfort Noise Aspects for Enhanced Full Rate (EFR) Speech Traffic Channels (Release 7)," 3GPP TS 46.062 V7.0.0 (Jun. 2007).
"3$^{rd}$ Generation Partnership Project; Technical Specification Group Services and System Aspects; Enhanced Full Rate (EFR) Speech Transcoding (Release 7)," 3GPP TS 46.060 V7.0.0 (Jun. 2007).
3$^{rd}$ Generation Partnership Project; Technical Specification Group Services and System Aspects; Inband Tandem Free Operation (TFO) of Speech Codecs; Service Description; Stage 3 (Release 7) 3GPP TS 28.062 V7.0.0, pp. 1-183 (Jun. 2007).
Series G: Transmission Systems and Media, Digital Systems and Networks; Digital Terminal Equipments—Coding of Analogue Signals by Methods Other than PCM; Coding of Speech at 8 kbit/s Using Conjugate-Structure Algebraic-Code-Excited Linear Prediction (CS-ACELP), pp. 1-146 (Jan. 2007).
"3$^{rd}$ Generation Partnership Project; Technical Specification Group Core Network and Terminals; Core Network Nb Interface user Plane Protocols (Release 5)," 3GPP TS 29.415 V5.2.0, pp. 1-14 (Dec. 2006).
"Series H: Audiovisual and Multimedia Systems; Infrastructure of Audiovisual Servies—Communication Procedures; Gateway Control Protocol: Version 3," ITU-T H.248.1, pp. 1-206 (Sep. 2005).
"3$^{rd}$ Generation Partnership Project; Technical Specification Group Services and System Aspects; Vocabulary for 3GPP Specification (Release 7)," 3GPP TR 21.905 V7.0.0, pp. 1-54 (Sep. 2005).

3rd Generation Partnership Project; Technical Specification Group Services and System Aspects; Mandatory Speech Codec Speech Processing Functions; Adaptive Multi-Rate (AMR) Speech Codec Frame Structure (Release 6), 3GPP TS 26.101 V6.0.0, pp. 1-20 (Sep. 2004).

"3rd Generation Parnetship Project; Technical Specification Group Radio Access Network; UTRAN lu Interface User Plane Protocols (Release 4)," 3GPP TS 25.415 V4.7.0, pp. 1-62 (Dec. 2002).

"General Aspects of Digital Transmission Systems; Terminal Equipments; Pulse Code Modulation (PCM) of Voice Frequencies," ITU-T G.711, pp. 1-12 (Nov. 1988).

Notice of Allowance and Fee(s) Due for U.S. Appl. No. 11/984,490 (Oct. 17, 2011).

* cited by examiner

DATA COMMUNICATION APPARATUS AND METHOD

CROSS-REFERENCE TO RELATED APPLICATION

The present invention claims the benefit under 35 USC §119(e) of prior U.S. provisional patent application Ser. No. 60/448,459 to Rabipour et al., filed Feb. 21, 2003, incorporated by reference herein.

FIELD OF THE INVENTION

The present invention relates generally to communications networks and, more particularly, to methods and apparatus for increasing the service quality and efficiency with which data is communicated between entities in such networks.

BACKGROUND OF THE INVENTION

According to most existing telecommunications standards, the transmission of speech information over a wireless interface takes the form of compressed speech parameters. Upon receipt of compressed speech parameters at a base station in communication with a mobile unit, the speech parameters are processed by a codec (coder/decoder), which converts (expands) the speech parameters into speech samples, typically at a rate of 64 kilobits per second (kb/s) in order to provide compatibility with the public switched telephone network (PSTN). The speech samples at 64 kb/s are then transmitted over the PSTN towards the called party. The speech samples associated with a given call may share the same link as speech samples associated with other calls by virtue of time division multiplexing (TDM), which provides for fixed-duration time slots to be allotted to individual calls.

If the called party is connected directly to the PSTN, such as via a wireline connection, the speech samples having travelled through the network will simply be converted into audio form by a digital telephone unit at the called party site. Of course, the called party may also be a second mobile unit, in which case the speech samples will terminate at a second base station, where a second codec re-converts the speech samples back into compressed speech parameters for transmission to the second mobile unit via a wireless interface. The usage of a source decoder to expand speech parameters into a stream of speech samples, in combination with the use of a destination encoder for re-compression of these samples into a second set of compressed speech parameters, is referred to as operation of codecs in tandem, or "tandem operation".

Those skilled in the art will appreciate that when both the called and calling parties are mobile units, the tandem operation described above introduces a degradation in service quality, as errors may be introduced by the decompression and re-compression operations performed by the source and destination codecs, respectively. Such error should in principle be avoidable, as neither codec operation is required by virtue of the second base station requiring the compressed speech parameters rather than the expanded speech samples. Thus, it is of interest to find a solution to the problem of service quality in call connections involving tandem codecs.

Two classes of solutions to the problem relating to the service quality in call connections involving tandem codecs have already been described and standardized, or are well in their way towards standardization. The earlier of the two methods, called Tandem-Free Operation (TFO), uses an in-band handshaking protocol to detect the presence of tandem codecs, and then proceeds to insert the compressed speech parameters within the 64 kb/s sample stream. This arrangement bypasses the requirement for decompression at the source codec and (re-)compression at the destination codec, which obviates the occurrence of errors at these two stages. As a result, a high quality of service can be achieved for a given end-to-end call between two mobile units. However, the standardized TFO approach provides no bandwidth advantage, as the full bandwidth ordinarily needed for the 64 kb/s sample stream is consumed for transmission of the compressed speech parameters.

A more recent approach, called Transcoder-Free Operation (TrFO), uses out-of-band signaling to detect call scenarios involving tandem codecs at call set-up time. Thereupon action is taken to put in place a direct end-to-end link to provide for a direct exchange of the compressed speech parameters without the involvement of network transcoders. However, while it provides for a savings and resource reduction compared to the standardized TFO approach, the TrFO implementation suffers from the disadvantage of added cost and complexity due to, for example, the requirement for out-of-band signaling.

For more information on the TFO and TrFO techniques, the reader is invited to refer to the following documents that are hereby incorporated by reference:

$3^{rd}$ generation partnership project, Technical specification group core network, Out of band transcoder control—Stage 2 (3GPP TS 23.153 V4.4.0 (2001-12));

$3^{rd}$ generation partnership project, Technical specification group core network, Bearer-independent circuit-switched core network, Stage 2 (3GPP TS 23.205 V4.4.0 (2002-03));

$3^{rd}$ generation partnership project, Technical specification group (TSG) RAN3, Transcoder free operation (3GPP TR 25.953 V4.0.0 (2001-03));

$3^{rd}$ generation partnership project, Technical specification group services and system aspects, Inband tandem free operation (TFO) of speech codecs, service description—Stage 3 (3GPP TS 28.062 V5.0.0 (2002-03));

It will thus be apparent that there is a need in the industry to provide a solution that is as robust and easy to implement, while also providing bandwidth and resource savings.

Moreover, the use of conventional codec-bypass schemes such as TFO has heretofore been limited to enhancing the quality of calls established between two suitably enabled base station units in a mobile-to-mobile call. When one party is not so enabled, e.g., a telephone connected to a common packet-switched network via a network gateway, the use of conventional codec-bypass techniques is not possible. It would therefore be an advantage to exploit the ability of one party's codec-bypass capabilities, even when the other party is not a suitably enabled base station unit.

In addition, the use of conventional codec-bypass schemes is often limited by the use of backhaul gateways in a network, even when both parties to a call are codec-bypass-enabled base station units. Such gateways compress speech samples into a different format prior to transmittal of the formatted speech samples over a network. Unfortunately, when codec-bypass information is carried within the bit structure of the speech samples, the compression effected by a backhaul gateway results in loss of the information and hence prevents advantageous usage of this facility. Hence, it would be beneficial to be able to allow tandem-free operation in circumstances where a backhaul gateway is used.

SUMMARY OF THE INVENTION

The present invention realizes that although an end-to-end codec-bypass connection along a given path between two endpoints may not be possible, it is nevertheless possible to achieve bandwidth savings by establishing a codec-bypass connection along only a portion of the path.

Therefore, according to a first broad aspect, the invention seeks to provide a communication apparatus, comprising a first interface for exchanging data with a first neighboring entity, a second interface for exchanging data with a second neighboring entity, a memory for storing codec information regarding the communication apparatus and a control entity operative to detect a first message from the first neighboring entity via the first interface, the first message being indicative of codec information regarding an originating entity. Responsive to detection of the first message, the control entity is operative to perform an assessment of compatibility between the codec information regarding the originating entity and the codec information regarding the communication apparatus. Responsive to the assessment of compatibility being positive, the control entity is operative to self-identify the communication apparatus as a candidate for terminally supporting a subsequent codec-bypass negotiation with the originating entity. Responsive to the assessment of compatibility being negative, the control entity is operative to self-identify the communication apparatus as a candidate for non-terminally supporting a subsequent codec-bypass negotiation with the originating entity.

According to a second broad aspect, the invention seeks to provide a method of establishing candidacy of a gateway as terminally or non-terminally supporting a codec-bypass negotiation with an originating entity in a communications network. The method comprises detecting a first message received from a first neighboring entity, the first message being indicative of codec information regarding the originating entity; assessing compatibility between the codec information regarding the originating entity and the codec information regarding the gateway; responsive to the assessment of compatibility being positive, self-identifying the gateway as a candidate for terminally supporting a subsequent codec-bypass negotiation with the originating entity; and, responsive to the assessment of compatibility being negative, self-identifying the gateway as a candidate for non-terminally supporting a subsequent codec-bypass negotiation with the originating entity.

The invention also seeks to provide, in accordance with a third broad aspect, computer-readable media tangibly embodying a program of instructions executable by a computer to perform the above method of establishing candidacy of a gateway as terminally or non-terminally supporting a codec-bypass negotiation with an originating entity in a communications network.

According to a fourth broad aspect, the present invention seeks to provide a method of establishing a codec-bypass connection between a first gateway and one of a plurality of in-path gateways located along a path from the first gateway to a second gateway. The method comprises identifying a target in-path gateway from among the plurality of in-path gateways, the target in-path gateway being the in-path gateway furthest along the path from the first gateway which is characterized by codec-bypass connection compatibility with the first gateway, and establishing a codec-bypass connection between the first gateway and the target in-path gateway.

The invention may also be summarized according to a fifth broad aspect as seeking to provide a method of establishing a codec-bypass connection along a path between a first gateway and a second gateway, the path comprising a plurality of in-path gateways. The method comprises identifying a first sub-path between the first gateway and a first target in-path gateway from among the plurality of in-path gateways, the first target in-path gateway being the in-path gateway furthest along the path from the first gateway which is characterized by codec-bypass connection compatibility with the first gateway. The method also comprises identifying a second sub-path between the second gateway and a second target in-path gateway from among the plurality of in-path gateways, the second target in-path gateway being the in-path gateway furthest along the path from the second gateway which is characterized by codec-bypass connection compatibility with the second gateway. The method further comprises determining the lengths of the first and second sub-paths and, if the first sub-path is longer than the second sub-path, establishing a codec-bypass connection between the first gateway and the first target gateway, otherwise if the second sub-path is longer than the first sub-path, establishing a codec-bypass connection between the second gateway and the second target gateway.

These and other aspects and features of the present invention will now become apparent to those of ordinary skill in the art upon review of the following description of specific embodiments of the invention in conjunction with the accompanying drawings.

DETAILED DESCRIPTION OF THE PREFERRED EMBODIMENTS

In accordance with an embodiment of the present invention, arbitrary combinations of wireless/wireline gateways collaborate constructively to reduce bandwidth and delay, and to achieve higher voice quality by removing—to the extent possible—tandem codecs (or vocoders). The present description herein below describes a method to resolve the disposition of the gateways that could find themselves involved in an codec-bypass connection. The gateways being given consideration are those which modify the speech payload (e.g. transcoding between different codec formats, including G.711).

Figure 1A:
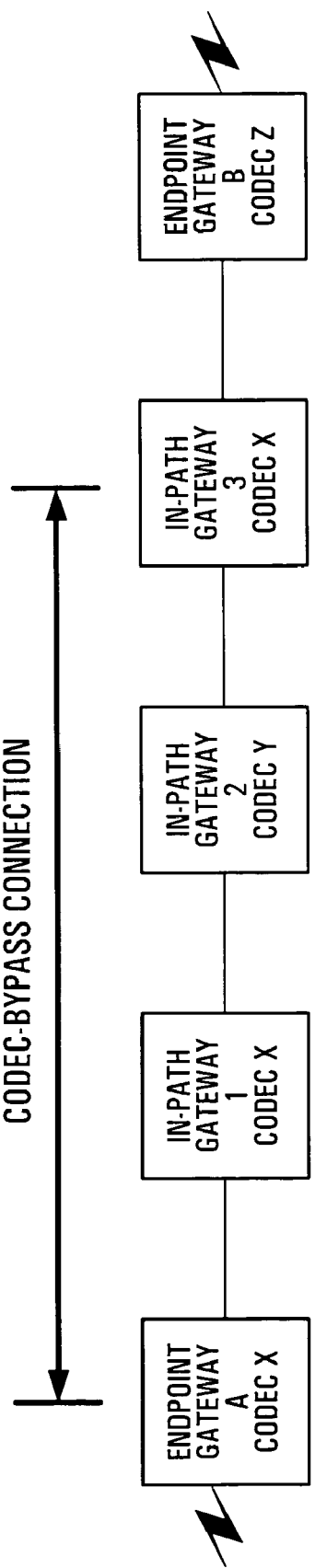
FIGS. 1A to 1D shows various call scenarios to which embodiments of the present invention are applicable.

With reference to FIG. 1A, a connection (e.g., a telephone call) is established between two endpoints A, B in a network consisting of a plurality of communication apparatuses hereinafter referred to as gateways. The network in question may include a circuit-switched network (e.g., the public switched telephone network—PSTN), a packet network or a combination thereof. Each of the endpoints A, B of the call may be either of a mobile station (wireless) or a land-based unit (wireline).

Various types of gateways are traversed by the call as it travels along subsequent legs of a call from one endpoint to another. The following definitions of various types of gateways have been provided for purposes of clarity, but without any intent to limit or otherwise restrict the scope of the present invention.

In particular, a "TDM gateway" is defined as a gateway that connects a circuit-switched network to a packet network. A "packet gateway" is defined as a gateway that connects only to a packet network. An "endpoint gateway" (or "termination gateway") is defined as a gateway located at an extreme end of the signal path. An example of an endpoint gateway is a UMTS gateway. In FIG. 1A, endpoint gateways include gateways A and B. Finally, an "in-path gateway" is defined as a gateway that is an intermediate node in the signal path (i.e. not an endpoint gateway). In FIG. 1A, in-path gateways include gateways 1, 2 and 3.

In general, a gateway comprises communications interfaces for communicating with neighbouring entities. In the case of an in-path gateway, the neighbouring entities are other gateways. Each gateway is configured to exchange signals in a variety of formats that are defined by a set of codecs with which the gateway is associated. Accordingly, each gateway is equipped with a memory element for storing codec information regarding the gateway in question. In the example of FIG. 1A, gateways A, 1 and 3 are associated with codec X, while gateway 2 is associated with codec Y and gateway B is associated with codec Z. It is noted that each gateway may be associated with more than one codec.

Once a call is established between the endpoints, the endpoint gateways attempt to establish a codec-bypass connection. This attempt is made through the exchange of codec-bypass negotiation messages during a codec-bypass negotiation. If the two endpoint gateways are associated with a common codec, then an end-to-end codec-bypass connection can indeed be established through codec-bypass negotiation (or "dialogue"). This provides significant quality enhancement.

When the two endpoint gateways are not associated with a common codec, then one may have recourse to a procedure whereby a codec-bypass connection is negotiated ("dialogued") for only a portion of the path that joins the endpoint gateways. This procedure, which is described in greater detail herein below, results in bandwidth savings and quality enhancement compared with the case where an attempt at establishing end-to-end codec-bypass mode of operation would be altogether abandoned. In a specific embodiment, the gateways along the path joining the endpoint gateways negotiate a codec-bypass mode of operation connection for the longest possible portion of that path.

It is assumed, for the purposes of description, that the various in-path gateways along the path are at least minimally codec-bypass compliant, without necessarily being able to terminate a codec-bypass negotiation or connection. Specifically, depending on the particular codec used by a remote entity and on the particular phase of a codec-bypass negotiation, a gateway is assumed to be at least capable of acquiring a "passive" mode. A gateway in "passive" mode is capable of relaying codec-bypass negotiation messages from one leg to another leg of a call that it serves, but it does not terminate the negotiation, i.e., it only serves to "passively support" a codec-bypass negotiation. However, depending on the capabilities of the gateway, the gateway may also be able to acquire an "active" mode for the purposes of the codec-bypass negotiation. In "active" mode, the gateway is capable of terminally supporting (i.e., terminating) a codec-bypass negotiation on at least one leg of a call that it serves. Thus, the gateway thus operates differently in passive mode and in active mode, assuming that the active mode can be acquired for a given codec-bypass negotiation.

Figure 2:
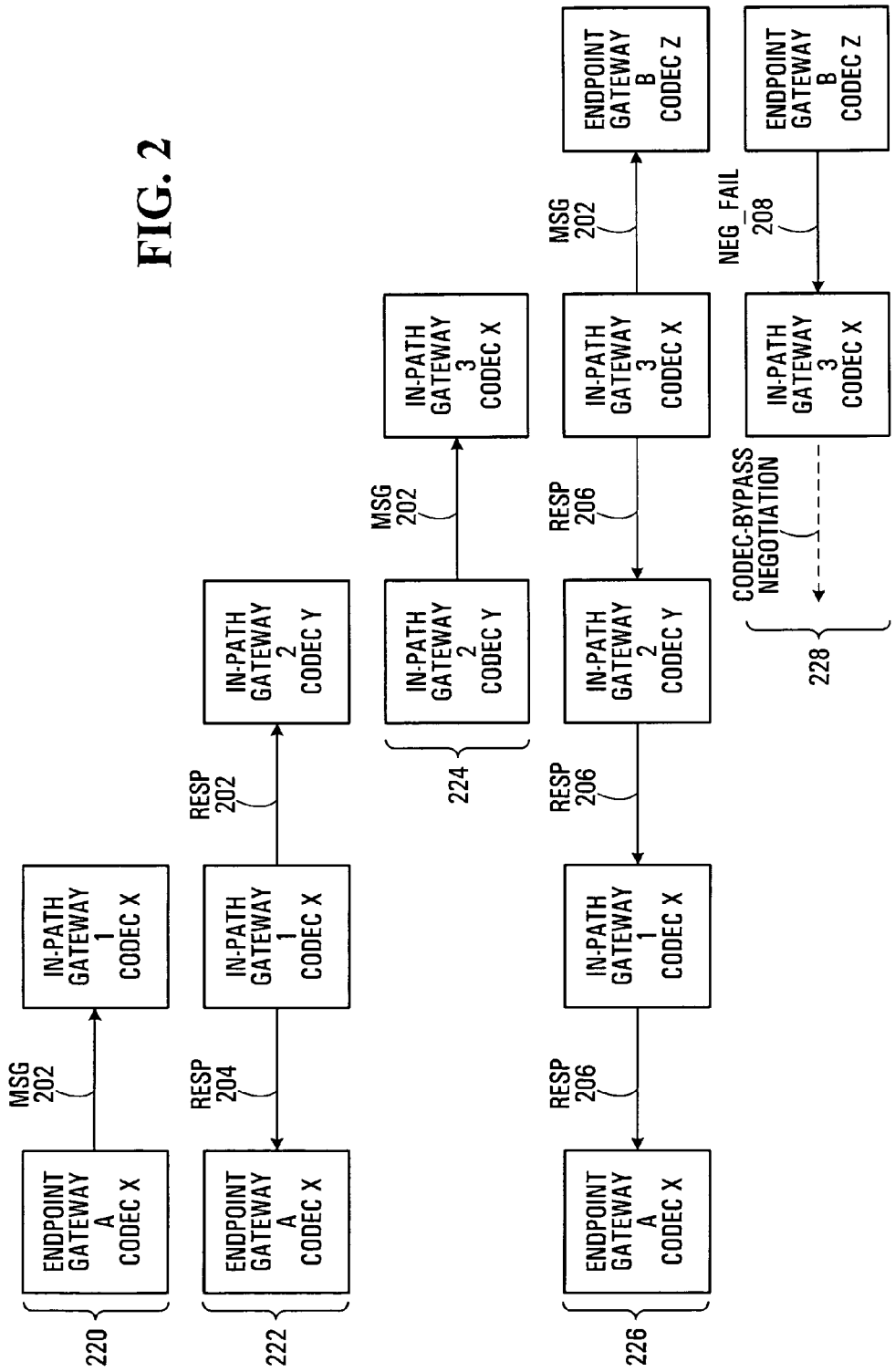
FIG. 2 is a message flow diagram illustrating various steps in establishing a codec-bypass connection in the scenario of FIG. 1A, in accordance with a specific embodiment of the present invention.
Figure 3:
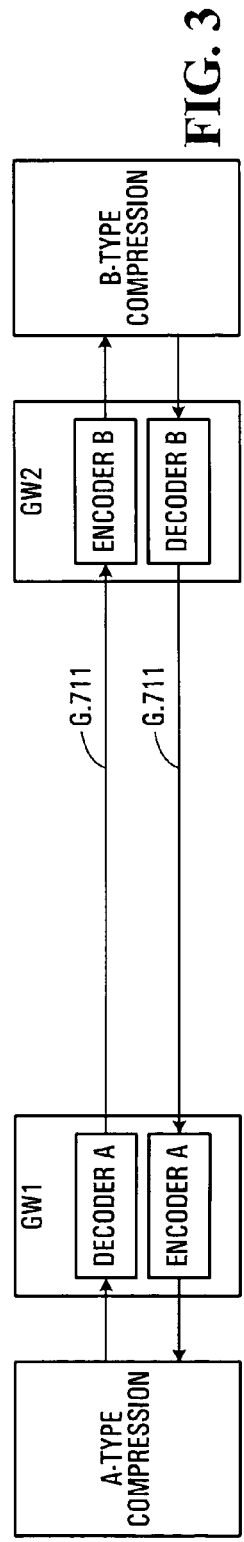
FIGS. 3 to 8 show various alternative configurations to which embodiments of the present invention are applicable.
Figure 4:
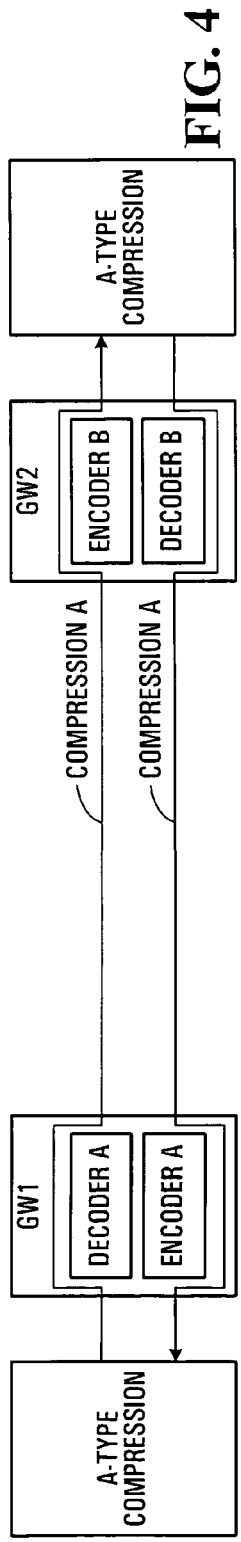
Figure 5:
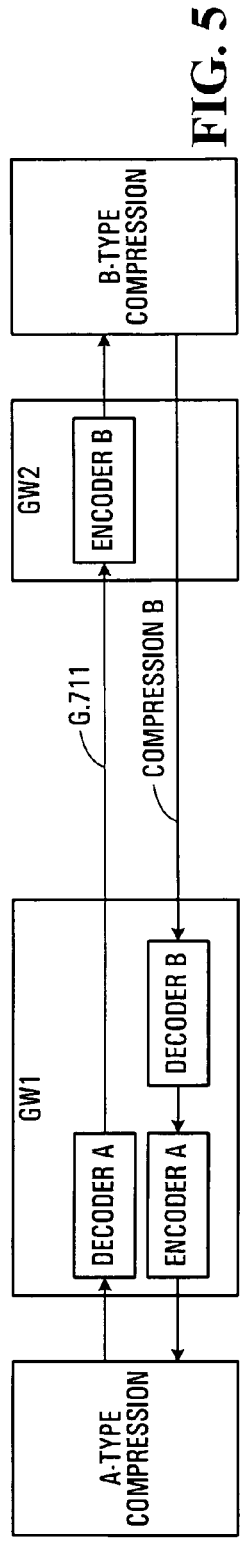
Figure 6:
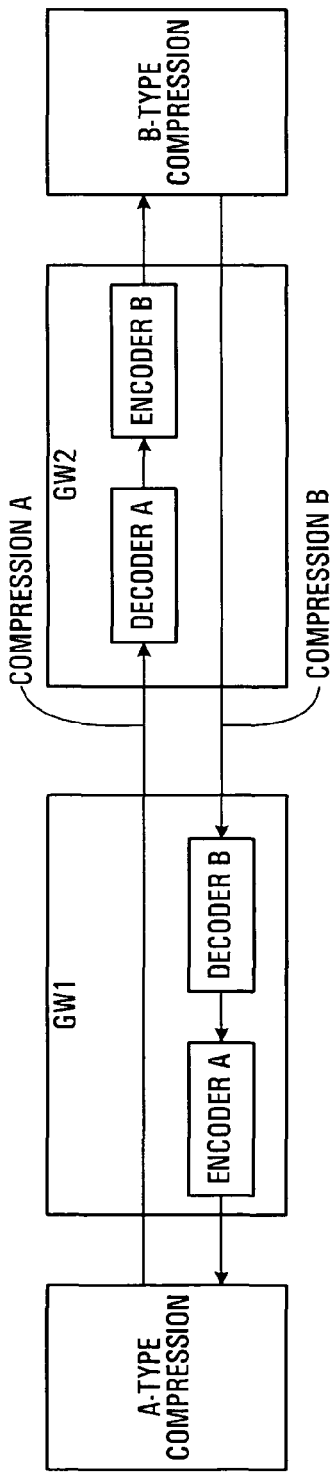
Figure 7:
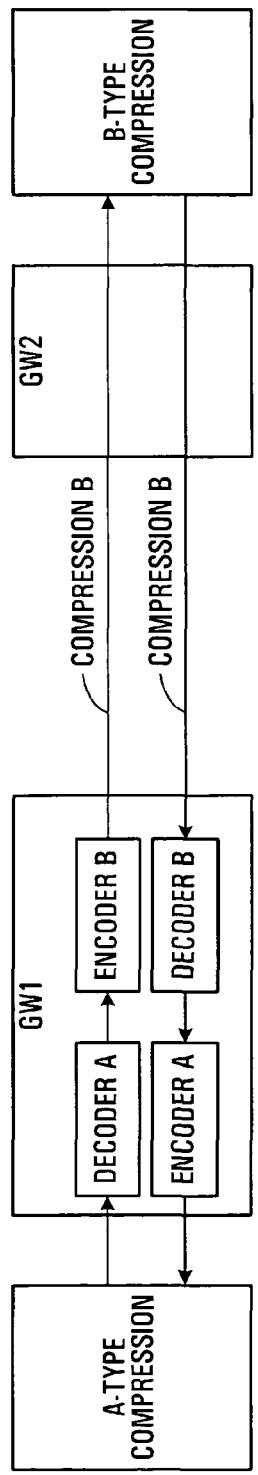
Figure 8:
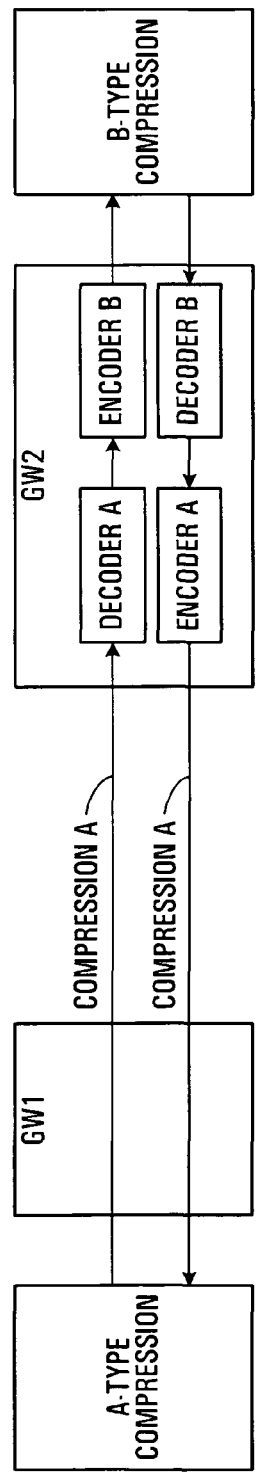

FIG. 2 illustrates a non-limitative example of operation of the present invention with respect to the specific scenario in FIG. 1A. The following describes the coordination of the in-path gateways 1, 2, 3 in response to codec-bypass negotiation messages initiated by endpoint gateway A and subsequently exchanged amongst the various other gateways in the path between endpoint gateways A and B. In particular, once a call is established, all codec-bypass-compliant gateways will start monitoring the bearer to detect codec-bypass negotiation messages. In addition to monitoring, those gateways that will have self-identified themselves as active will start transmitting codec-bypass negotiation messages. Optionally, the active in-path gateways can wait for a finite time period before initiating codec-bypass transmissions. This is meant to give priority to transmissions initiated by endpoint gateways.

Thus, for example, at 220, endpoint gateway A starts by transmitting an initial codec-bypass negotiation message 202. The initial message 202 carries the codec information regarding endpoint gateway A, specifically a list of codec types and configurations supported by endpoint gateway A. In this case, the codec information identifies "codec X" as being supported at endpoint gateway A. Optionally, an endpoint gateway can provide a designated data element (e.g., a single bit) to identify its codec-bypass messages as having emanated from one end of the end-to-end connection in question.

When the $i^{th}$ in-path gateway (denoted GW(i) for convenience) receives the initial message 202 originated from endpoint gateway A, and if the codec type and codec configuration listed in the initial message 202 matches in-path GW(i)'s internally supported codec type and configuration, then in-path gateway GW(i) will return a response message towards endpoint gateway A through in-path gateways GW(i−1), GW(i−2), etc. The purpose of the response message is to signal to in-path gateway GW(i−1) and beyond (towards the endpoint gateway A) that in-path gateway GW(i) has the ability to support a compatible codec type and configuration. In-path gateway GW(i) thus goes through the process of identifying itself as a candidate gateway, capable of terminating the current codec-bypass negotiation with endpoint gateway A. In-path gateway GW(i) therefore self-identifies itself as an "active" gateway. However, as the response message travels towards endpoint gateway A, any previously determined active gateways in the chain will re-self-identify itself as a passive gateway upon receipt of the response message.

For example, at 222, in-path gateway 1, upon receipt of the initial message 202, realizes that it has a compatible codec type and configuration (namely, codec X). This causes the in-path gateway 1 to make a "mental note" of the fact that it is now active, i.e., in-path gateway 1 is now a candidate for terminating the codec-bypass negotiation with endpoint gateway A. The making of a "mental note" can take many forms, such as self-identification by way of setting a binary flag whose two states correspond to active and passive, respectively. This also results in in-path gateway 1 sending a response message 204 back to the endpoint gateway A. Meanwhile, gateway 1 forwards the initial message 202 towards in-path gateway 2.

At 224, in-path gateway 2, upon receipt of the initial message 202, realizes that it has does not have a codec type and configuration compatible with "codec X". In-path gateway 2 therefore plays the role of a passive gateway. Under such circumstances, in-path gateway 2 simply forwards the initial message 202 towards in-path gateway 3 without any indication back towards in-path gateway 1.

At 226, in-path gateway 3, upon receipt of the initial message 202, realizes that it has a codec type and configuration compatible with "codec X". Accordingly, the in-path gateway 3 makes a "mental note" of the fact that it is now active, i.e., in-path gateway 3 is now a candidate for eventually terminating the current codec-bypass negotiation with endpoint gateway A. Again, the making of a "mental note" can take many forms, such as self-identification by way of setting a binary flag whose two states correspond to active and passive, respectively. This also results in in-path gateway 3 forwarding the initial message 202 towards endpoint B, while sending a second response message 206 back to the in-path gateway 2.

At gateway 2, being a passive gateway, the second response message 206 is simply forwarded to in-path gateway 1. However, a different effect is produced at in-path gateway 1, which had previously self-identified itself as active. The receipt of the second response message 206 by the in-path gateway 1 sigls to the in-path gateway 1 that a gateway further down the chain towards endpoint gateway B is now active due to its capability of terminating the current codec-bypass negotiation. Therefore, in-path gateway 1 switches its mode of operation to "passive".

The above-described process stops when a particular in-path gateway receives a message, i.e. a codec-bypass message transmitted by endpoint gateway B, or when a self-identified candidate fails to receive any codec-bypass messages, e.g. due to absence of the endpoint gateway B for end-to-end codec-bypass connection. In the former case, the self-identified candidate will go into passive mode only temporarily, in order to relay the codec-bypass message back towards endpoint gateway A, so as to allow end-to-end codec-bypass negotiation. If the end-to-end negotiation between endpoint gateways A and B is successful, all in-path gateways, including the one that temporarily went into passive mode, remain in passive mode. However, in the case where there is no end-to-end codec-bypass connection due to a negotiation failure, the last self-identified codec-bypass candidate will transmit a message in an attempt to start a codec-bypass negotiation with endpoint gateway A.

Thus, for example, at 228, endpoint gateway B does not have a codec type and configuration compatible with "codec X". Therefore, endpoint gateway B either does not send a message back to gateway 3, or (as illustrated) endpoint gateway B sends a neg_fail message 208 (negotiation failure) towards in-path gateway 3. Receipt of the neg_fail message 208 and in-path gateway 3 signals to the in-path gateway 3 that it is the furthest gateway from endpoint gateway A that is capable of terminating the codec-bypass negotiation. Accordingly, as shown in FIG. 1A, in-path gateway 3 negotiates a codec-bypass connection with endpoint gateway A.

Figure 1B:
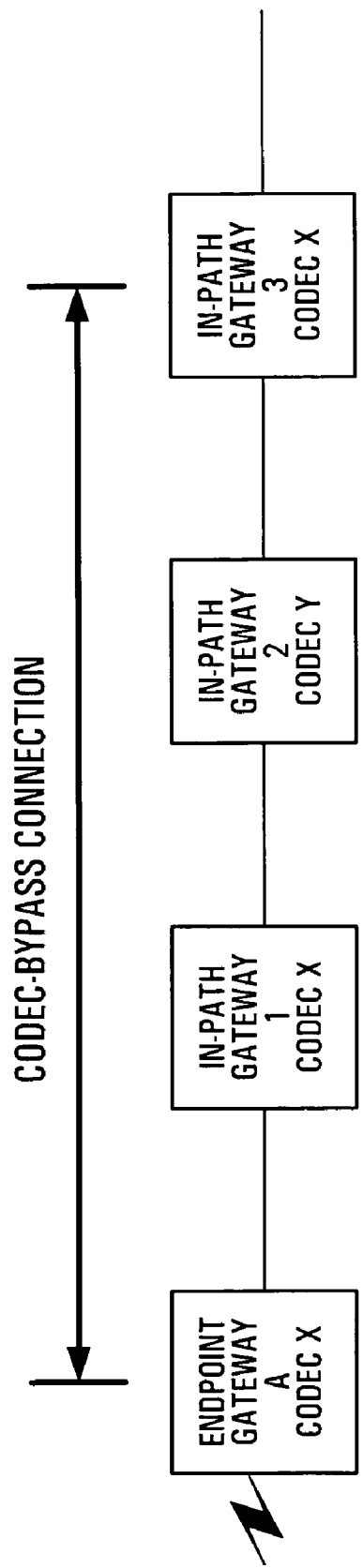

Of course, it is also possible that no end-to-end codec-bypass connection is possible due to sheer absence of endpoint gateway B. This scenario, shown in FIG. 1B, causes basically the same end result, with the active in-path gateway furthest along the path from endpoint gateway A transmitting a response message in an attempt to start negotiation of a codec-bypass connection with endpoint gateway A.

At the same time that endpoint gateway A attempts to dialogue with gateways further along the path towards endpoint gateway B, endpoint gateway B itself may be attempting to dialogue with gateways further along the path towards endpoint gateway A. By completing analogous processes for both endpoint gateways A and B (and waiting until both options have been explored), a codec-bypass communication with the longest possible span from either endpoint can be established.

Figure 1C:
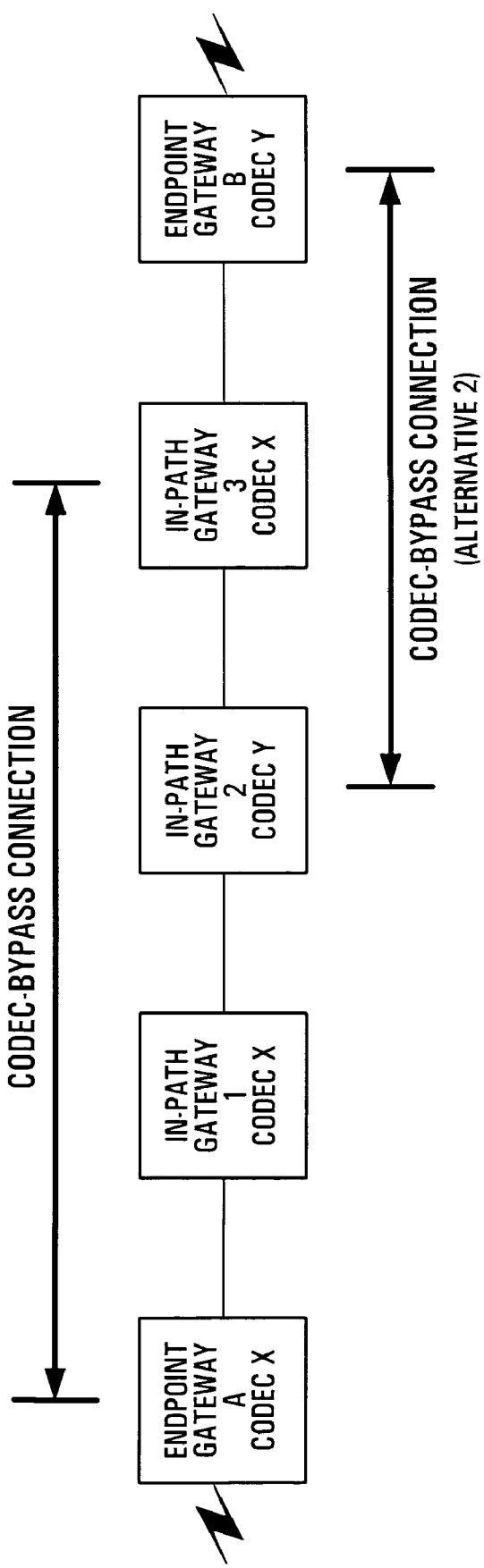

As illustrated in FIG. 1C, there also could be a scenario in which the end-to-end codec-bypass negotiation fails due to codec mismatch, but where the possibility of overlap between two possible codec-bypass connections nonetheless exists. The two active in-path gateways (from both ends) have knowledge if the end-to-end mismatch resolution was attempted or not (e.g., via presence or absence of exchanged request and acknowledge messages). After the active in-path gateways confirm the scenario, a codec-bypass solution can be provided. In short, codec-bypass negotiation between an in-path gateway with a terminating gateway will not be disrupted by a codec-bypass attempt by the remote endpoint gateways.

Specifically, as per the existing codec-bypass decision algorithm or codec mismatch resolution rules, all codecs are ranked in preference. During the scenario being contemplated, there are two incompatible codec types/configurations at endpoint gateways A and B, but each can establish a respective codec-bypass connection with a different one of the in-path gateways (namely in-path gateway 3 with endpoint gateway A and in-path gateway 2 with endpoint gateway B). An active in-path gateway which has identified itself as the codec-bypass candidate for termination of codec-bypass negotiation in one direction but which supports a less preferred codec type/configuration will continue to send a response message (e.g., 204 or 206 in FIG. 2) in order to maintain its candidacy; however, it will refrain from initiating codec-bypass negotiation for a certain delay after the scenario is entered. This is meant to allow an active in-path gateway supporting the preferred codec type/configuration to initiate the codec-bypass negotiation first.

Figure 1D:
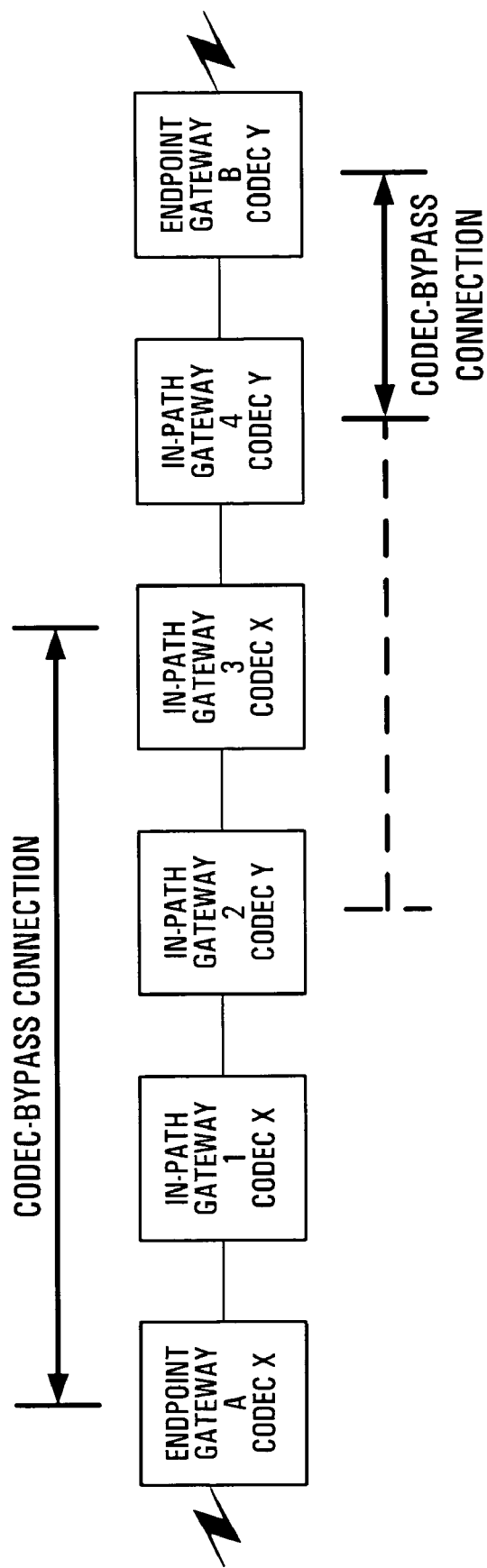

In the example of FIG. 1D, if codec X is preferred to codec Y, then in-path gateway 3 will initiate a codec-bypass negotiation with terminating gateway A while in-path gateways 1 and 2 remain passive. Both in-path gateways 2 and 4 can initiate codec-bypass negotiation with endpoint gateway B after the specified delay. If there is no codec-bypass connection established across in-path gateway 2, in-path gateway 2 may optionally transmit a message to initiate a codec-bypass negotiation with endpoint gateway B. However, as is the case in the illustrated embodiment, a codec-bypass connection is established between endpoint gateway A and in-path gateway 3, which means that in-path gateway 2 self-identifies itself as passive. Therefore, in-path gateway 4 will not receive the response message (204 or 206) from in-path gateway 2 and will therefore remain self-identified as active, i.e., it is a candidate for terminating the codec-bypass negotiation with endpoint gateway B. (This design is applicable to all other in-path gateways in the chain supporting codec Y.) In this manner, the furthest in-path gateway from endpoint B which supports codec Y and is outside the codec-bypass connection between endpoint gateway A and in-path gateway 3 is sought for the purposes of initiating codec-bypass negotiation with in-path gateway 4. In the illustrated embodiment, this title is held by in-path gateway 4, which supports codec Y and is outside the codec-bypass connection between endpoint gateway A and in-path gateway 3. As a result, two separate non-overlapping codec-bypass connections can be established. Generally speaking, the present invention allows for more than one segment of codec-bypass negotiations.

An in-path gateway that detects codec-bypass negotiation messages only from one "side" (as viewed in the orientation in FIGS. 1A-1D and 2) can become a codec-bypass termination point. If codec-bypass transmissions are detected on both sides (labeled "left" and "right" sides for Packet GW, and "packet" and "TDM" for TDM GW), the behavior of (active) gateways is determined based on the mutual vocoder compatibility of the two remote nodes, as well as that of the gateway itself. Tables 1-4 define the behavior of Packet and TDM gateways under specific embodiments of the present invention.

As an enhancement, a data element (e.g., a single bit) can be used to identify cases in which a gateway needs to receive traffic in the "original" compression format (i.e. compression format at the time of call setup—e.g., G.711) even after establishment of a codec-bypass connection. This bit can be used in two cases. Firstly, it will be used by passive gateways to make sure that adjacent gateways will continue to send them the traffic signal in the original format (e.g., G.711) as well as in other compressed formats after the establishment of a codec-bypass connection. Secondly, this bit will also be used by active TDM gateways that may not be able to support the codec selected for establishment of a codec-bypass connection, to request that adjacent gateways continue to send them the traffic signal in the original format (e.g., G.711) as well as in other compressed formats after the establishment of a codec-bypass connection.

TABLE 1

Packet gateway codec compatibility when adjacent gateways do not require original codec format

| GW/Left | GW/Right | Left/Right | Resolution |
|---|---|---|---|
| X | X | Y | Gateway is passive towards both end nodes. "Left" and "Right" switch to common codec |
| Y | Y | N | Depending on the availability of CPU resources, gateway can be active towards either or both end nodes independently to achieve bandwidth and/or delay optimization |
| N | Y | N | Gateway is active towards right-side end node |
| Y | N | N | Gateway is active towards left-side end node |
| N | N | N | Gateway is passive towards both end nodes. Codec-bypass negotiation cannot be terminated with either end. |

Legend:
GW/Left: This column indicates whether or not the gateway and the "left"-side end node have common codecs
GW/Right: This column indicates whether or not the gateway and the "right"-side end node have common codecs
Left/Right: This column indicates whether or not the left- and right-side end nodes have common codecs with each other (but not necessarily with the gateway)
Y: the two entities have at least one compatible vocoder
N: the two entities have no compatible vocoders
X: It makes no difference whether or not a compatible vocoder exists

TABLE 2

TDM Gateway codec compatibility when adjacent packet gateway and TDM-side node do not require original codec format

| GW/Packet | GW/TDM | Packet/TDM | Resolution |
|---|---|---|---|
| Y | Y | Y | Gateway is passive towards both end nodes. Packet-side and TDM-side end nodes switch to common codec. |
| N | N | Y | Gateway is passive towards both end nodes. Codec-bypass negotiation cannot be terminated with either end node, although end-to-end codec-bypass negotiation may transit the gateway. Sets bit to indicate (to packet side) that it requires traffic in the format that was in use at call setup |
| N | N | N | Gateway is passive towards both end nodes. Codec-bypass negotiation cannot be terminated with either end node |
| Y | N | N | Gateway is active towards packet-side end node |
| Y | N | Y | Gateway is active towards packet-side end node. Alternatively, gateway can remain passive to allow codec-bypass negotiation to transit the gateway. In such case, set bit to indicate (to packet side) that traffic is required in the format that was in use at call setup |
| N | Y | N | Gateway is active towards TDM-side end node |
| N | Y | Y | Gateway is active towards TDM-side end node. Alternatively, gateway can remain passive to allow codec-bypass negotiation to transit the gateway. In such case, set bit to indicate (to packet side) that traffic is required in the format that was in use at call setup |

Legend:
GW/Left: This column indicates whether or not the gateway and the "left"-side end node have common codecs
GW/Right: This column indicates whether or not the gateway and the "right"-side end node have common codecs
Left/Right: This column indicates whether or not the left- and right-side end nodes have common codecs with each other (but not necessarily with the gateway)
Y: the two entities have at least one compatible vocoder
N: the two entities have no compatible vocoders
X: It makes no difference whether or not a compatible vocoder exists

TABLE 3

Packet gateway codec compatibility when "left" gateway requires original codec format

| GW/Left | GW/Right | Left/Right | Resolution |
|---|---|---|---|
| Y | Y | Y | Gateway is active towards the right-side end node and towards the left-side end node |
| Y | N | Y | Gateway is passive towards both end nodes. Sets special bit towards "right" to indicate the need to support original codec format. Codec-bypass negotiation will transit the gateway |
| N | Y | Y | Gateway is passive towards both end nodes. Sets special bit towards "right" to indicate the need to support original codec format. Codec-bypass negotiation will transit the gateway. Alternatively, gateway can be active towards the right-side end node |
| N | N | Y | Gateway is passive towards both end nodes. Sets special bit towards "right" to indicate the need to support original codec format. Codec-bypass negotiation will transit the gateway |
| N | N | N | Gateway is passive towards both end nodes. Codec-bypass negotiation cannot be terminated with either end node |
| Y | N | N | Gateway will be active towards the left-side end node |
| N | Y | N | Gateway will be active towards the right-side end node |
| Y | Y | N | Depending on CPU availability, gateway will be active towards the left-side end node and/or the right-side end node |

Legend:
GW/Left: This column indicates whether or not the gateway and the "left"-side end node have common codecs
GW/Right: This column indicates whether or not the gateway and the "right"-side end node have common codecs
Left/Right: This column indicates whether or not the left- and right-side end nodes have common codecs with each other (but not necessarily with the gateway)
Y: the two entities have at least one compatible vocoder
N: the two entities have no compatible vocoders
X: It makes no difference whether or not a compatible vocoder exists

TABLE 4

TDM gateway codec compatibility when adjacent packet gateway requires original codec format

| GW/Packet | GW/TDM | Packet/TDM | Resolution |
|---|---|---|---|
| Y | Y | Y | Gateway is passive towards both end nodes |
| N | N | Y | Gateway is passive towards both end nodes. Codec-bypass negotiation cannot be terminated with either end node, although end-to-end codec-bypass negotiation may transit the gateway. Sets bit to indicate (to packet side) that it requires traffic in the format that was in use at call setup |
| N | N | N | Gateway is passive towards both end nodes. Codec-bypass negotiation cannot be terminated with either end |
| Y | N | N | Gateway is active towards the packet-side node |
| Y | N | Y | Gateway is active towards packet-side end node. Alternatively, gateway can remain passive to allow codec-bypass negotiation to transit the gateway. In such case, set bit to indicate (to packet side) that traffic is required in the format that was in use at call setup |
| N | Y | N | Gateway is active towards the TDM-side node |
| N | Y | Y | Gateway is active towards TDM-side end node. Alternatively, gateway can remain passive to allow codec-bypass negotiation to transit the gateway. In such case, set bit to indicate (to packet side) that traffic is required in the format that was in use at call setup |
| Y | Y | N | Depending on the availability of CPU resources, gateway can be active towards either or both end nodes independently to achieve bandwidth and/or delay optimization |

Legend:
GW/Left: This column indicates whether or not the gateway and the "left"-side end node have common codecs
GW/Right: This column indicates whether or not the gateway and the "right"-side end node have common codecs
Left/Right: This column indicates whether or not the left- and right-side end nodes have common codecs with each other (but not necessarily with the gateway)
Y: the two entities have at least one compatible vocoder
N: the two entities have no compatible vocoders
X: It makes no difference whether or not a compatible vocoder exists It should be understood that other modifications of, and additions to, the present invention are possible. For example, the self-identification process described herein above is applicable to the various example, non-limiting scenarios depicted in FIGS. 3 to 8.

Also, it is recalled that the rules and procedures above essentially lead to clarification of a particular in-path gateway's disposition. Specifically, a codec-bypass-compliant in-path gateway will know whether or not it is the last in-path gateway and whether or not it has vocoders common with each of the endpoints. Equipped with this information, should a codec-bypass connection fail to establish due to the absence of a compatible codec type or configuration at either end, the above methods can be applied recursively in order to come up with codec-bypass connection segments where applicable, for the purpose of reducing bandwidth where applicable. The recursive application of the procedure means that the last in-path gateways (rather than the endpoint gateways) would initiate their own search for codec-bypass partners based on their full suite of supported vocoders. In initiating the codec-bypass handshaking these gateways will also take advantage of their knowledge of the vocoders supported by the endpoints to achieve maximum bandwidth savings and voice quality. A pre-defined vocoder order of preference will guide the application of the procedure, e.g., in situations where each of the two last in-path gateways supports the vocoder of different endpoints only. The prescribed order of vocoder preference will determine which of the two last in-path gateways will initiate the new round of codec-bypass handshaking. The in-path gateway which supports a vocoder with a lower priority will wait for a prescribed period of time before initiating its own codec-bypass handshaking. This priority scheme prevents race conditions that may lead to instability.

Should the procedure initiated by the last in-path gateways fail to achieve codec-bypass mode of operation due to the absence of common vocoders, the recursion can be applied again to search for yet more limited application of codec-bypass mode of operation. Thus, the in-path gateways can identify themselves to be in the middle of the path, rather than the last in-path gateway, by monitoring codec-bypass exchanges around them including the usage of a suitable message. Again, the procedure may result in several segments of codec-bypass negotiations, i.e. not limited to a single segment.

Those skilled in the art will appreciate that the control entity of each gateway may be implemented as an arithmetic and logic unit (ALU) having access to a code memory (not shown) which stored program instructions for the operation of the ALU. The program instructions could be stored on a medium which is fixed, tangible and readable directly by the processor, (e.g., removable diskette, CD-ROM, ROM, or fixed disk), or the program instructions could be stored remotely but transmittable to the processor via a modem or other interface device (e.g., a communications adapter) connected to a network over a transmission medium. The transmission medium may be either a tangible medium (e.g., optical or analog communications lines) or a medium implemented using wireless techniques (e.g., microwave, infrared or other transmission schemes).

Those skilled in the art should also appreciate that the program instructions stored in the code memory can be compiled from a high level program written in a number of programming languages for use with many computer architectures or operating systems. For example, the high level program may be written in assembly language, while other versions may be written in a procedural programming language (e.g., "C") or an object oriented programming language (e.g., "C++" or "JAVA").

Those skilled in the art should further appreciate that in some embodiments of the invention, the functionality of the control entity may be implemented as pre-programmed hardware or firmware elements (e.g., application specific integrated circuits (ASICs), electrically erasable programmable read-only memories (EEPROMs), etc.), or other related components.

While specific embodiments of the present invention have been described and illustrated, it will be apparent to those skilled in the art that numerous modifications and variations can be made without departing from the scope of the invention as defined in the appended claims.

We claim:

1. A communication apparatus, comprising:
a first interface for exchanging data with a first neighboring entity;
a second interface for exchanging data with a second neighboring entity;
a memory for storing codec information regarding said communication apparatus;
a control entity for detecting, after a call is established, a first message from the first neighboring entity via the first interface, the first message being indicative of codec information regarding an originating entity of the first message;
the control entity being configured to, responsive to detection at the first message, perform an assessment of compatibility between the codec information regarding the originating entity of the first message and the codec information regarding said communication apparatus;

the control entity being configured to, responsive to the assessment of compatibility being positive, self-identify the communication apparatus as a candidate for terminally supporting a subsequent codec-bypass negotiation with the originating entity of the first message, wherein terminally supporting the subsequent codec-bypass negotiation with the originating entity of the first message includes transcoding subsequent messages received from the originating entity of the first message according to the codec information regarding the originating entity of the first message and forwarding the transcoded messages to an intermediate entity configured to further forward the transcoded messages toward their destination; and the control entity being configured to, responsive to the assessment of compatibility being negative, self-identify the communication apparatus as a candidate for non-terminally supporting a subsequent codec-bypass negotiation with the originating entity of the first message.

2. The communication apparatus defined in claim 1, further configured to, responsive to the assessment of compatibility being positive, release a second message towards the first neighboring entity via the first interface, the second message being indicative of the communication apparatus being self-identified as a candidate for terminally supporting a subsequent codec-bypass negotiation with the originating entity of the first message.

3. The communication apparatus defined in claim 1, further configured to, responsive to absence of any message from the second entity indicative of the second entity being self-identified as a candidate for terminally supporting subsequent codec-bypass negotiation with the originating entity of the first message, effect said subsequent codec-bypass negotiation with the first entity.

4. The communication apparatus defined in claim 1, wherein the control entity is configured to forward the first message to the second remote entity via the second interface.

5. The communication apparatus defined to claim 1, wherein the first and second interfaces are packet interfaces.

6. The communication apparatus defined in claim 1, wherein the first interface is a packet interface and the second interface is a circuit-switched interface.

7. The communication apparatus defined in claim 1, therein the first and second interfaces are circuit-switched interfaces.

8. The communication apparatus defined in claim 1, the control entity being further configured to:

detect a second message received from the second neighboring entity, the second message being indicative of the second neighboring entity apparatus being self-identified as a candidate for terminally supporting subsequent codec-bypass negotiation with the originating entity of the first message; and responsive to detection of the second message, self-identify the communication apparatus as a candidate for non-terminally supporting a subsequent codec-bypass negotiation with the originating entity of the first message.

9. The communication apparatus defined in claim 8, wherein the control entity is configured to forward the second message to the first remote entity via the first interface.

10. The communication apparatus defined in claim 8, wherein the control entity is configured to monitor messages exchanged via the first and second interfaces that are indicative of negotiation of a codec-bypass connection between the originating entity of the first message and an entity different from the originating entity of the first message.

11. The communication apparatus defined in claim 10, said negotiation being a first negotiation, wherein the control entity is further configured to:

detect success or failure of said first negotiation; and responsive to failure of said first negotiation, and if the communication apparatus is self-identified as a candidate for terminally supporting a subsequent codec-bypass negotiation with the originating entity of the first message, negotiate with the originating entity of the first message a codec-bypass connection between the communication apparatus and the originating entity of the first message.

12. The communication apparatus defined in claim 11, wherein the control entity is configured to, responsive to success of said first negotiation, and if the communication apparatus is self-identified as a candidate for terminally supporting a subsequent codec-bypass negotiation with the originating entity of the first message, self-identify the communication apparatus as a candidate for non-terminally supporting a codec-bypass negotiation with the originating entity of the first message.

13. The communication apparatus defined in claim 10, said negotiation being a first negotiation, wherein the control entity is further configured to:

detect success or failure of said first negotiation; and responsive to success of said first negotiation, and if the communication apparatus is self-identified as a candidate for terminally supporting a subsequent codec-bypass negotiation with the originating entity of the first message, self-identify the communication apparatus as a candidate for non-terminally supporting a codec-bypass negotiation with the originating entity of the first message.

14. The communication apparatus defined in claim 11, wherein the originating entity of the first message is a end-point gateway.

15. The communication apparatus defined in claim 11, wherein the originating entity of the first message is an in-path gateways.

16. A method of establishing candidacy of a gateway as terminally or non-terminally supporting a codec-bypass negotiation with an originating entity in a communications network, the method comprising:

after a call is established:

detecting a first message received from a first neighboring entity, the first message being indicative of codec information regarding the originating entity of the first message;

assessing compatibility between the codec information regarding the originating entity of the first message and the codec information regarding the gateway;

responsive to the assessment of compatibility being positive, self-identifying the gateway as a candidate for terminally supporting a subsequent codec-bypass negotiation with the originating entity of the first message, wherein terminally supporting the subsequent codec-bypass negotiation with the originating entity of the first message includes transcoding subsequent messages received from the originating entity of the first message according to the codec information regarding the originating entity of the first message and forwarding the transcoded messages to an intermediate entity configured to further forward the transcoded messages toward their destination; and responsive to the assessment of compatibility being negative, self-identifying the gateway as a candidate for non-terminally supporting a subsequent codec-bypass negotiation with the originating entity the first message.

17. A non-transitory computer-readable media tangibly embodying a program of instructions executable by a computer to perform a method of establishing candidacy of a gateway as terminally or non-terminally supporting a codec-bypass negotiation with an originating entity in a communications network, the method comprising:

after a call is established:
  detecting a first message received from a first neighboring entity, the first message being indicative of codec information regarding the originating entity of the first message;
  assessing compatibility between the codec information regarding the originating entity of the first message and the codec information regarding the gateway;
  responsive to the assessment of compatibility being positive, self-identifying the gateway as a candidate for terminally supporting a subsequent codec-bypass negotiation with the originating entity of the first message wherein terminally supporting the subsequent codec-bypass negotiation with the originating entity of the first message includes transcoding subsequent messages received from the originating entity of the first message according to the codec information regarding the originating entity of the first message and forwarding the transcoded messages to an intermediate entity configured to further forward the transcoded messages toward their destination; and
  responsive to the assessment of compatibility being negative, self-identifying the gateway as a candidate for non-terminally supporting a subsequent codec-bypass negotiation with the originating entity of the first message.

* * * * *